United States Patent
Sun et al.

(10) Patent No.: US 11,643,358 B2
(45) Date of Patent: May 9, 2023

(54) OPTICAL GLASS, PREPARATION METHOD THEREOF, BACKLIGHT MODULE AND DISPLAY MODULE

(71) Applicants: Beijing BOE Display Technology Co., Ltd., Beijing (CN); BOE Technology Group Co., Ltd., Beijing (CN)

(72) Inventors: Xiaodi Sun, Beijing (CN); Haijun Shi, Beijing (CN); Qingshan Qu, Beijing (CN); Shanlei Hou, Beijing (CN); Wei Zhong, Beijing (CN); Changjia Fu, Beijing (CN); Enliang Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/504,392

(22) Filed: Oct. 18, 2021

(65) Prior Publication Data
US 2022/0289620 A1   Sep. 15, 2022

(30) Foreign Application Priority Data
Mar. 10, 2021   (CN) .......................... 202110260979.6

(51) Int. Cl.
*C03C 4/12* (2006.01)
*G02F 1/1335* (2006.01)
(Continued)

(52) U.S. Cl.
CPC ................ *C03C 4/12* (2013.01); *C03B 19/02* (2013.01); *C03C 1/026* (2013.01); *C03C 14/004* (2013.01);
(Continued)

(58) Field of Classification Search
CPC ..... C03C 14/004; C03C 17/002; C03C 1/026; C03C 4/12
(Continued)

(56) References Cited

U.S. PATENT DOCUMENTS 10,221,354 B2 * 3/2019 Nick ..................... C03B 19/102
2019/0047903 A1 * 2/2019 Iwasaki .................... C03C 4/12
(Continued)

FOREIGN PATENT DOCUMENTS

| CN | 105114867 A | 12/2015 |
|---|---|---|
| CN | 105315621 A | 2/2016 |

(Continued)

OTHER PUBLICATIONS

CN202110260979.6 first office action and search report.

*Primary Examiner* — Christopher M Raabe
(74) *Attorney, Agent, or Firm* — IPro, PLLC (57) ABSTRACT

Optical glass, a preparation method thereof, a backlight module and a display module. The optical glass comprises a glass substrate and optical masterbatches, which are dispersed in the glass substrate, each optical masterbatch comprises a quantum dot fluorescent agent inner core and an encapsulation shell which encloses the quantum dot fluorescent agent inner core. A quantum dot fluorescent agent is protected by the encapsulation shell and the luminous efficiency is high; when the optical glass is applied to a display module, the color gamut may be improved; moreover, the glass is capable of preventing against the invasion of water vapor, even the quantum dot fluorescent agent at an edge of the glass rarely fails, and an edge failure size is basically avoided; meanwhile, the expansion coefficient is small, and an expansion space reserved during assembly is extremely small.

20 Claims, 8 Drawing Sheets

(51) Int. Cl.
  *C03B 19/02*  (2006.01)
  *C03C 1/02*  (2006.01)
  *C03C 14/00*  (2006.01)
  *C03C 17/00*  (2006.01)
  *G02F 1/13357*  (2006.01)

(52) U.S. Cl.
  CPC ...... *C03C 17/002* (2013.01); *G02F 1/133512* (2013.01); *G02F 1/133528* (2013.01); *G02F 1/133606* (2013.01); *G02F 1/133608* (2013.01); *G02F 1/133614* (2021.01); *C03C 2214/04* (2013.01); *C03C 2214/30* (2013.01)

(58) Field of Classification Search
  USPC .......................................................... 362/84
  See application file for complete search history.

(56) References Cited

U.S. PATENT DOCUMENTS

2020/0123439 A1* 4/2020 Ando ........................ G02B 5/20
2020/0148592 A1* 5/2020 Lee ..................... C03C 23/0015

FOREIGN PATENT DOCUMENTS

| | | |
|---|---|---|
| CN | 106279924 A | 1/2017 |
| CN | 106918952 A | 7/2017 |
| CN | 208506440 U | 2/2019 |
| CN | 111443524 A | 7/2020 |
| CN | 112028477 A | 12/2020 |
| JP | 2018197782 A | 12/2018 |

\* cited by examiner

OPTICAL GLASS, PREPARATION METHOD THEREOF, BACKLIGHT MODULE AND DISPLAY MODULE

CROSS REFERENCE TO RELEVANT APPLICATIONS

The present application claims the priority of the Chinese patent application filed on Mar. 10, 2021 before the Chinese Patent Office with the application number of 202110260979.6 and the title of "OPTICAL GLASS, PREPARATION METHOD THEREOF, BACKLIGHT MODULE AND DISPLAY MODULE", which is incorporated herein in its entirety by reference.

TECHNICAL FIELD

The disclosure relates to the technical field of display, in particular to optical glass, a preparation method thereof, a backlight module and a display module.

BACKGROUND

At present, large-size spliced screens are used for display more and more widely, especially in exhibitions, supermarkets, conference rooms, concerts and other scenarios. Physical seams between spliced display units are getting smaller and smaller, and the ultimate goal of spliced display is "0 seam" display. Besides, with the rapid development of technology, spliced display screens pursue higher screen brightness, more gorgeous picture effect, higher color saturation and better light uniformity. By using quantum dot films, red and green quantum dots are excited by high-energy blue light, narrow half-peak width spectra are emitted, and the purity of primary light is higher, so the color expression range is greatly increased.

SUMMARY

The disclosure provides optical glass, a manufacturing method thereof, a backlight module and a display module.

In one aspect of the disclosure, optical glass is provided. According to the embodiment of the disclosure, the optical glass comprises a glass substrate and optical masterbatches dispersed in the glass substrate, wherein each optical masterbatch comprises a quantum dot fluorescent agent inner core and an encapsulation shell which encloses the quantum dot fluorescent agent inner core. According to the optical glass, a quantum dot fluorescent agent is protected by the encapsulation shell, so that the luminous efficiency is high; when the optical glass is applied to a display module, the color gamut may be improved; moreover, the glass is capable of preventing against the invasion of water vapor, even the quantum dot fluorescent agent at an edge of the glass rarely fails, and an edge failure size is basically avoided; meanwhile, the expansion coefficient is small, and an expansion space reserved during assembly is extremely small, so that when the optical glass is applied to a spliced screen, a seam width may be greatly reduced, the visual splitting effect is weakened, and the display quality is improved.

In another aspect of the disclosure, a preparation method of optical glass is provided. According to the embodiment of the disclosure, the method comprises: mixing an encapsulation mixture with quantum dot fluorescent agents, and sequentially granulating and photocuring an obtained first mixture to obtain optical masterbatches; and mixing the optical masterbatches with glass substrate powder, and casting an obtained second mixture to obtain the optical glass.

In another aspect of the disclosure, a backlight module is provided. According to the embodiment of the disclosure, the backlight module comprises the optical glass described above.

In yet another aspect of the disclosure, a display module is provided. According to the embodiment of the disclosure, the display module comprises the backlight module described above.

According to the embodiment of the disclosure, the display module comprises a backplane; a supporting frame connected with the backplane to form a supporting structure together with the backplane, the supporting structure having an accommodating space; a luminous base plate arranged on one side of the backplane and located in the accommodating space; optical glass arranged on a side, away from the luminous base plate, of the supporting structure; and a display screen arranged on a side, away from the backplane, of the optical glass.

According to the embodiment of the disclosure, the display screen comprises an active area and a non-active area surrounding the active area, and an outline of an orthographic projection of the optical glass on the display screen is located in the non-active area.

According to the embodiment of the disclosure, the backplane comprises a first side wall, a bottom plate and a second side wall which are connected in sequence, the bottom plate comprises a first horizontal section, a first inclined section, a second horizontal section, a second inclined section and a third horizontal section which are connected in sequence, the first horizontal section is connected with the first side wall, and the third horizontal section is connected with the second side wall; surfaces, close to the optical glass, of the first horizontal section, the second horizontal section and the third horizontal section are parallel to a light-exiting surface of the optical glass; a non-zero included angle exists between a surface, close to the optical glass, of the first inclined section and the light-exiting surface of the optical glass, a non-zero included angle exists between a surface, close to the optical glass, of the second inclined section and the light-exiting surface of the optical glass, and ends, connected with the second horizontal section, of the first inclined section and the second inclined section are inclined towards the optical glass; and the luminous base plate is arranged on the surface, close to the optical glass, of the second horizontal section.

According to the embodiment of the disclosure, the supporting frame comprises: a frame body; and at least one limiting part arranged outside the frame body, an end, close to the optical glass, of the limiting part being connected with an end, close to the optical glass, of the frame body to define a limiting groove, wherein a side wall of the backplane is arranged in the limiting groove in a matching mode and fixed to the supporting frame through a fastener.

According to the embodiment of the disclosure, an included angle between the frame body of the supporting frame and a horizontal section of the backplane is 80-90 degrees.

According to the embodiment of the disclosure, a triangle is formed by the lines connecting a stressed support point between the frame body of the supporting frame and the optical glass, a fixation point of the fastener, and a stressed support point between the limiting part of the supporting frame and the metal backplane.

According to the embodiment of the disclosure, a gain film is arranged on the light-exiting surface of the optical glass, and optionally, the gain film comprises at least one of a prism film, a dual brightness enhancement film, a diffusion film, a dual brightness enhancement film and a prism composite film.

According to the embodiment of the disclosure, the gain film is completely attached to the light-exiting surface of the optical glass by glue.

According to the embodiment of the disclosure, the display module further comprises an upper polarizer arranged on a surface, away from the backplane, of the display screen; a lower polarizer arranged on a surface, close to the backplane, of the display screen; a first light shielding layer arranged on a side, away from the display screen, of the upper polarizer, an orthographic projection of the first light shielding layer on the display screen being located in the non-active area of the display screen; and a second light shielding layer arranged on a side, away from the display screen, of the lower polarizer, an orthographic projection of the second light shielding layer on the display screen being located in the non-active area of the display screen; wherein an orthographic projection of the optical glass on the display screen covers an orthographic projection of the upper polarizer on the display screen and an orthographic projection of the lower polarizer on the display screen, a first gap exists between an outline of the orthographic projection of the upper polarizer on the display screen and an outline of the orthographic projection of the optical glass on the display screen, a second gap exists between an outline of the orthographic projection of the lower polarizer on the display screen and the outline of the orthographic projection of the optical glass on the display screen, the orthographic projection of the first light shielding layer on the display screen covers the first gap, and the orthographic projection of the second light shielding layer on the display screen covers the second gap.

According to the embodiment of the disclosure, a third light shielding layer is arranged on an end surface of a side surface of the optical glass, and a covering layer is arranged on a surface, away from the optical glass, of the third light shielding layer.

BRIEF DESCRIPTION OF THE DRAWINGS

To describe the technical solutions of the present disclosure more clearly, the accompanying drawings required for describing some embodiments of the present disclosure may be briefly introduced below. Apparently, the accompanying drawings in the following description are merely accompanying drawings of some embodiments of the present disclosure. To those of ordinary skills in the art, other accompanying drawings may also be derived from these accompanying drawings without creative efforts. In addition, the accompanying drawings in the following description may be regarded as schematic diagrams, and are not a limitation on the actual size of the product and the actual process of the method involved in the embodiment of the present disclosure.

DETAILED DESCRIPTION

Embodiments of the disclosure are described in detail below. The embodiments described below are exemplary and are only used to explain the disclosure, and should not be construed as limiting the disclosure. If specific technologies or conditions are not indicated in the embodiments, they shall be performed according to the technologies or conditions described in the literature in this field or according to the product specifications. Reagents or instruments used not marked with manufacturers are conventional products that are available in the market.

Figure 1:
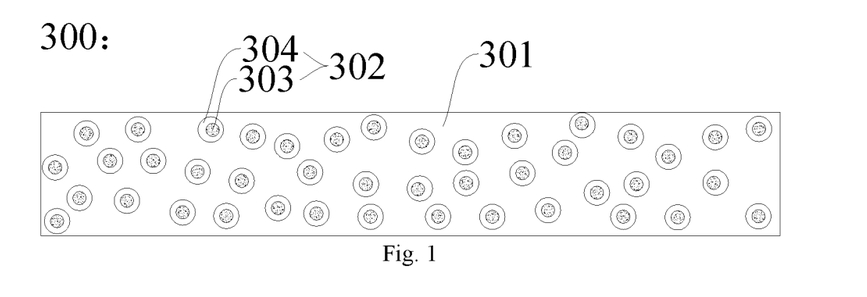
FIG. 1 is a structural diagram of optical glass according to an embodiment of the disclosure.

In one aspect of the disclosure, optical glass is provided. According to the embodiment of the disclosure, referring to FIG. 1, the optical glass 300 comprises a glass substrate 301 and optical masterbatches 302 dispersed in the glass substrate, wherein each optical masterbatch 302 comprises a quantum dot fluorescent agent inner core 303 and an encapsulation shell 304 which encloses the quantum dot fluorescent agent inner core. According to the optical glass, a quantum dot fluorescent agent is protected by the encapsulation shell, so that the luminous efficiency is high; when the optical glass is applied to a display module, the color gamut may be improved; moreover, the glass is capable of preventing against the invasion of water vapor, even the quantum dot fluorescent agent at an edge of the glass rarely fails, basically, there is no edge failure size; meanwhile, the expansion coefficient is small, and an expansion space reserved during assembly is extremely small, so that when the optical glass is applied to a spliced screen, a seam width may be greatly reduced, the visual splitting effect is weakened, and the display quality is improved.

Figure 2:
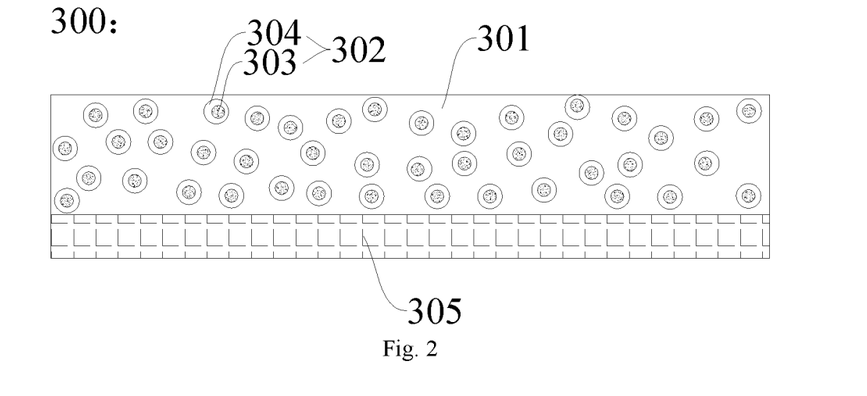
FIG. 2 is a structural diagram of optical glass according to an embodiment of the disclosure.
Figure 3:
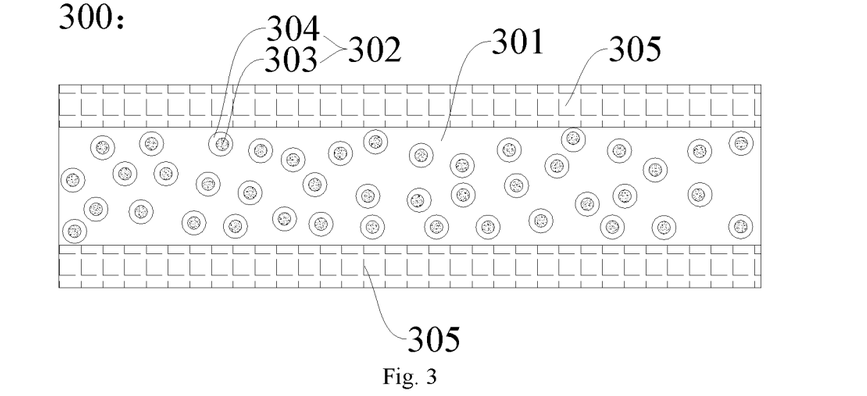
FIG. 3 is a structural diagram of optical glass according to an embodiment of the disclosure.

According to the embodiment of the disclosure, referring to FIG. 2, the optical glass may further comprise a diffusion particle layer 305 arranged on at least one surface of the glass substrate 301. Therefore, the optical glass has good diffusion performance, which makes light emitted by a light source to be diffused to form a uniform surface light source. When the optical glass is applied to a display module, an additional diffuser plate is not needed, which may effectively reduce the thickness of a device. Specifically, the diffusion particle layer may be arranged only on one surface of the glass substrate (refer to FIG. 2) or on two surfaces of the glass substrate (refer to FIG. 3).

According to the embodiment of the disclosure, a specific type of diffusion particles may be flexibly determined according to actual needs. In some specific embodiments, the diffusion particles may be at least one of inorganic diffusion particles and organic diffusion particles, the inorganic diffusion particles include but are not limited to one or more of silicon dioxide, titanium dioxide, barium sulfate, calcium carbonate, zinc oxide, zirconium oxide and zinc sulfide, and the organic diffusion particles include but are not limited to organosilicone and polymethylmethacrylate (PMMA).

According to the embodiment of the disclosure, a specific type of the glass substrate used in this step may be flexibly determined according to the specific properties of the obtained optical glass. In some specific embodiments, the glass substrate comprises a nano-calcium ultra-white glass substrate. Therefore, the optical glass has good properties and is applicable to a backlight module.

According to the embodiment of the disclosure, a specific type of the quantum dot fluorescent agent adopted may be determined according to the requirements for light color, wavelength range and the like. In some specific embodiments, the quantum dot fluorescent agent comprises at least one of a green quantum dot fluorescent agent and a red quantum dot fluorescent agent, wherein the green quantum dot fluorescent agent may be a luminescent nanocrystal which is of a core-shell structure with a single luminescent peak position, and a luminescent peak range of the green quantum dot fluorescent agent may be 510-550 nm (such as 510 nm, 520 nm, 530 nm, 540 nm and 550 nm); and the red quantum dot fluorescent agent may be a luminescent nanocrystal which is of a core-shell structure with a single luminescent peak position, and a luminescent peak range of the red quantum dot fluorescent agent may be 610-670 nm (such as 610 nm, 620 nm, 630 nm, 640 nm, 650 nm, 660 nm and 670 nm). As a result, the quantum dot fluorescent agent emits narrow half-peak width spectra, the purity of primary light is higher, the color expression range is greatly increased, and the color gamut may be expanded to 100-120% NTSC.

According to the embodiment of the disclosure, the encapsulation shell may be formed by photocuring at least one of a diffusing agent, an anti-UV agent, an oxidizing agent, a light stabilizer and a lubricating dispersant. Specifically, the diffuser may be an organosilicone light diffuser, specifically polymer microspheres which are of a three-dimensional structure connected by silicon-oxygen bonds, such as Shin-Etsu organosilicone light diffuser; the anti-UV agent may include benzoic acid, benzophenone, benzotriazole anti-UV agents, etc; the oxidant may be tris(2,4-di-tert-butylphenyl) phosphite, which helps to improve oxidation resistance; the light stabilizer may include one or more of epoxy acrylic resin, polyurethane acrylic resin and vinyl ether resin; and the lubricating dispersant may be polyethylene wax, the molecular weight of the polyethylene wax may be 2000-2500 (such as 2000, 2100, 2200, 2300, 2400 and 2500), and a softening point may be 60-65° C. (specifically 60° C., 61° C., 62° C., 63° C., 64° C., 65° C., etc.). Therefore, the material availability is high, the cost is low, low-temperature curing is feasible, and the protection effect on the quantum dot fluorescent agent after curing is better.

Figure 4:
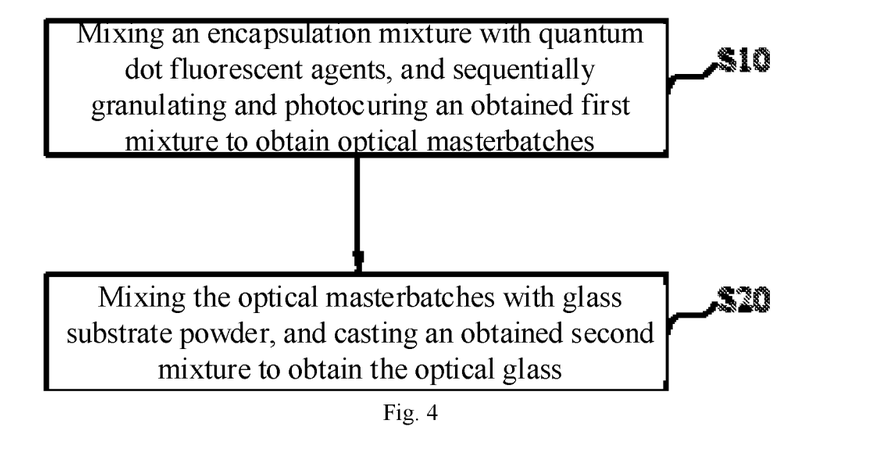
FIG. 4 is a flowchart of a preparation method of optical glass according to an embodiment of the disclosure.

In one aspect of the disclosure, a manufacturing method of optical glass is provided. According to the embodiment of the disclosure, referring to FIG. 4, the method comprises the following steps:

S10, mixing an encapsulation mixture with quantum dot fluorescent agents, and sequentially granulating and photocuring an obtained first mixture to obtain optical masterbatches.

Figure 5:
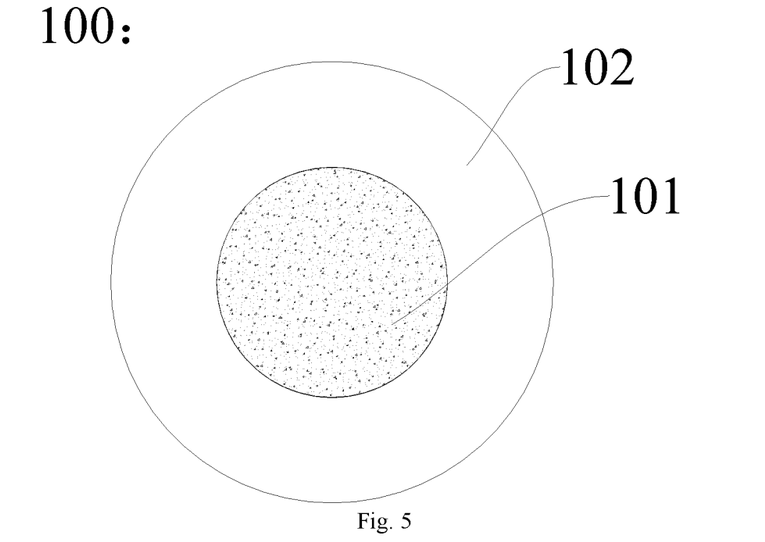
FIG. 5 is a structural diagram of an optical masterbatch according to an embodiment of the disclosure.

In this step, the encapsulation mixture and the quantum dot fluorescent agent may be uniformly mixed by granulation, the encapsulation mixture encloses the quantum dot fluorescent agent, and subsequent photocuring allows the encapsulation mixture to be cured at a low temperature, so that the quantum dot fluorescent agent is encapsulated while it is effectively ensured that quantum dots do not fail. In some specific examples, when photocuring conditions are met, the light stabilizer may effectively cure and encapsulate the quantum dot fluorescent agent. It may be understood that the optical masterbatch obtained by granulation and photocuring has a core-shell structure. Specifically, referring to FIG. 5, the optical masterbatch 100 comprises a quantum dot fluorescent agent inner core 101 and an encapsulation shell 102, and the encapsulation shell 102 encloses the quantum dot fluorescent agent inner core 101. Therefore, the quantum dot fluorescent agent may be effectively protected against failures.

According to the embodiment of the disclosure, a mass ratio of the encapsulation mixture to the quantum dot fluorescent agent may be (1-25):(1-9), such as 1:9, 1:5, 1:1, 5:1, 10:1, 15:1, 20:1 and 25:1. In this ratio range, better diffusion uniformity may be achieved without intensity loss of the quantum dot fluorescent agent.

Specifically, the granulation may be performed by adopting a double-screw granulator, and specific granulation pressure may be 3-15 MPa (such as 3 MPa, 4 Mpa, 5 MPa, 6 Mpa, 7 Mpa, 8 Mpa, 9 Mpa, 10 Mpa, 11 Mpa, 12 Mpa, 13 Mpa, 14 Mpa and 15 Mpa). Within this pressure range, all components may be fully and uniformly mixed.

Specifically, a UV light source (ultraviolet light source) may be used for photocuring, curing energy is 100-2000 J/m2 (for example, 100 J/m2, 300 J/m2, 500 J/m2, 800 J/m2, 1000 J/m2, 1200 J/m2, 1500 J/m2, 1800 J/m2 and 2000 J/m2), and a curing time is 3-60 min (for example, 3 min, 10 min, 20 min, 30 min, 40 min, 50 min and 60 min). The photocuring parameters may ensure that the quantum dot fluorescent agent is fully cured and stably encapsulated.

According to the embodiment of the disclosure, the encapsulation mixture may comprise at least one of a diffusing agent, an anti-UV agent, an oxidizing agent, a light stabilizer and a lubricating dispersant. It may be understood that the diffusing agent, the anti-UV agent, the oxidizing agent, the light stabilizer and the lubricating dispersant may be the same as the diffusing agent, the anti-UV agent, the oxidizing agent, the light stabilizer and the lubricating dispersant involved in the optical glass mentioned above, and will not be described in detail here.

According to the embodiment of the disclosure, a specific type of the quantum dot fluorescent agent adopted may be determined according to the requirements for light color, wavelength range and the like. In some specific embodiments, the quantum dot fluorescent agent used in this method is the same as the quantum dot fluorescent agent described in the optical glass mentioned above, and will not be described in detail here.

Figure 6:
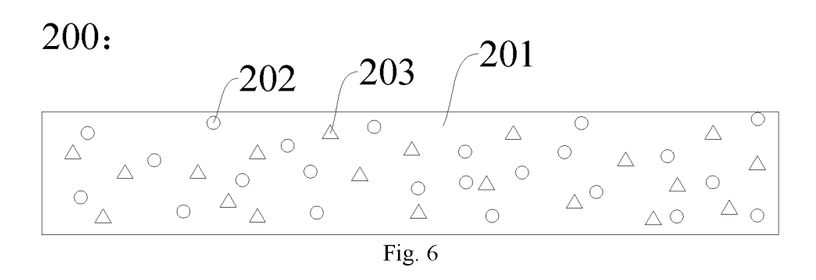
FIG. 6 is a structural diagram of optical glass according to another embodiment of the disclosure.

In some specific embodiments, referring to FIG. 6, the optical glass 200 is applied to a backlight module of a liquid crystal display. In this case, the above-mentioned red quantum dot fluorescent agents 202 and green quantum dot fluorescent agents 203 may be applied at the same time, i.e., the red quantum dot fluorescent agents 202 and green quantum dot fluorescent agents 203 are dispersed in a glass substrate 201, so that the obtained optical glass may emit red light and green light under the excitation of a blue light source, and combined with blue light emitted by the light source, the backlight module may emit white light for liquid crystal display.

S20, mixing the optical masterbatches with glass substrate powder, and casting an obtained second mixture to obtain the optical glass.

According to the embodiment of the disclosure, in this step, mixing the optical masterbatches with the glass substrate powder may comprise: pretreating the optical masterbatches at a temperature of 150° C.-500° C. (for example, 150° C., 200° C., 250° C., 300° C., 350° C., 400° C., 450° C. and 500° C.) for 1-5 h (for example, 1 h, 2 h, 3 h, 4 h and 5 h), then dissolving the pretreated optical masterbatches and the glass substrate powder at 800° C.-1500° C. (for example, 800° C., 900° C., 1000° C., 1100° C., 1200° C., 1300° C., 1400° C. and 1500° C.), and keeping the temperature for 3-10 h (for example, 3 h, 4 h, 5 h, 6 h, 7 h, 8 h, 9 h and 10 h). Therefore, the optical masterbatches may be uniformly mixed with the glass substrate powder without agglomeration, so as to obtain optical glass with better uniformity.

According to the embodiment of the disclosure, in this step, the casting may be specifically performed by placing the second mixture on a roller bed to be sent to a channel annealing furnace to be heated and then cooled to a low temperature by high-pressure cold air. The casting method may generate stable glass blocks with simple steps and easy operation.

According to the embodiment of the disclosure, a mass ratio of the optical masterbatches to the glass substrate powder may be (3-10): 100, such as 3:100, 4:100, 5:100, 6:100, 7:100, 8:100, 9:100 and 10:100. In this ratio range, the light decay life of the quantum dot fluorescent agent may be prolonged, thus prolonging the service life of the display module.

According to the embodiment of the disclosure, a specific type of the glass substrate powder configured in this step may be flexibly determined according to the specific properties of the obtained optical glass. In some specific embodiments, the glass substrate powder comprises a nano-calcium ultra-white glass substrate powder. Therefore, the optical glass has better properties and is applicable to a backlight module.

In some specific embodiments, the optical glass satisfies at least one of the following conditions: transmittance is 45%-55% (such as 45%, 48%, 50%, 52% and 55%); and haze is 80%-95% (such as 80%, 82%, 85%, 88%, 90%, 92% and 95%). Within these ranges of transmittance and haze, both the screen shielding property and the brightness specification of the display module may be considered.

Figure 7:
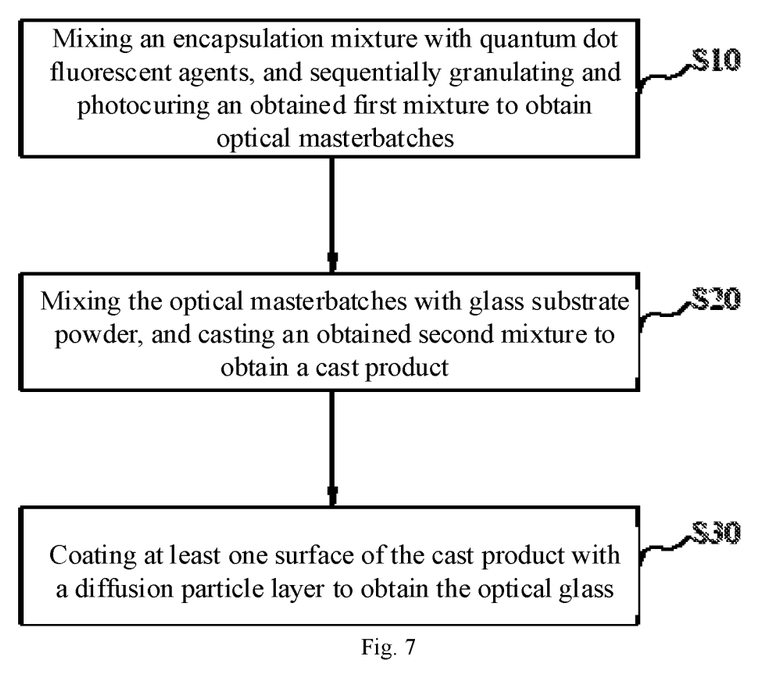
FIG. 7 is a flowchart of a preparation method of optical glass according to an embodiment of the disclosure.

According to the embodiment of the disclosure, referring to FIG. 7, the method may further comprise: S30, coating at least one surface of a product obtained by casting with a diffusion particle layer. Specifically, a slurry containing diffusion particles may be applied to a surface of the glass substrate, and then dried to form a film, so as to obtain the diffusion particle layer. A specific type of the diffusion particles may be the same as that described in the above optical glass, and will not be repeated here.

In the method, the encapsulation mixture and the quantum dot fluorescent agent are mixed in advance to prepare the optical masterbatches, so that the quantum dot fluorescent agent may be effectively encapsulated by using the encapsulation mixture; the photocuring temperature is low, so that the quantum dot fluorescent agent may not fail in the curing process; meanwhile, due to the encapsulation effect of the encapsulation mixture, the quantum dot fluorescent agent may not fail in the subsequent casting process, and the problem that an edge failure is caused around the obtained optical glass due to moisture/oxygen intrusion, thus leading to peripheral bluing may be avoided; in addition, the expansion coefficient of the optical glass is low, a machining allowance required when the optical glass is assembled with other components is small, and the reservation of an expansion space is not needed; therefore, when the optical glass is applied to spliced screens, a seam width may be effectively reduced, the color gamut and display quality may be improved, and ultra-narrow spliced screen display featuring a high color gamut may be finally implemented. In addition, the optical glass substrate may be provided with the diffusion particle layer, so that light emitted from the optical glass may be converted into a uniform surface light source, which facilitates application in backlight sources, and an additional diffusion plate is not needed, thus reducing the thickness of a device.

In another aspect of the disclosure, a backlight module is provided. According to the embodiment of the disclosure, the backlight module comprises the aforementioned optical glass or optical glass prepared by the aforementioned method. The backlight module has all the features and advantages of the optical glass mentioned above, that is, besides color gamut improvement, a seam width is reduced when the backlight module is applied to spliced display, and the thickness of the backlight module is reduced, which is conductive to the thinning of the backlight module.

Figure 8:
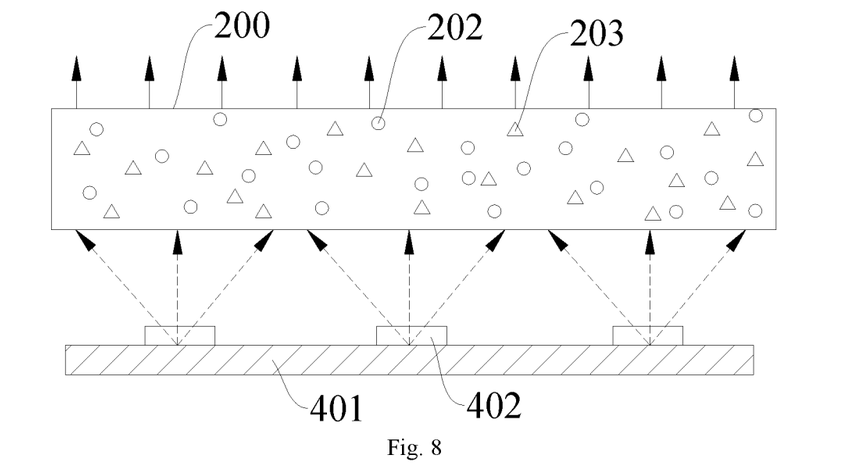
FIG. 8 is a diagram of a light path of a backlight module according to an embodiment of the disclosure.

It may be understood that in addition to the aforementioned optical glass, the backlight module may also comprise necessary structures and components of a conventional backlight module, such as a backplane, a luminous base plate (such as an LED luminous base plate) and necessary optical films, which may be determined with reference to the conventional technology, and will not be described in detail here. In a specific example, a specific light path in the backlight module is explained by assuming that the optical glass in the backlight module contains both red quantum dot fluorescent agents and green quantum dot fluorescent agents, and the light source is a blue light source. Referring to FIG. 8, a light-emitting element 402 (e.g., Mini LED) on the luminous base plate 401 emits blue light, the blue light incident into the optical glass may excite the red quantum dot fluorescent agents 202 and the green quantum dot fluorescent agents 203 to emit red light and green light respectively, the blue light emitted by the light source is mixed with the red light and green light emitted by the quantum dot fluorescent agents to form white light which is emitted from the optical glass, the light is converted into collimated white light by the optical glass and then emitted, and thus the backlight module may be used as a backlight source of a liquid crystal display. Besides, by adopting the optical glass, an additional diffuser plate is not needed, which is conductive to the thinning of the backlight module.

In yet another aspect of the disclosure, a display module is provided. According to the embodiment of the disclosure, the display module comprises the backlight module described above. The display module is suitable for spliced display to realize a small seam width and greatly improve the display effect of a spliced screen.

Figure 9:
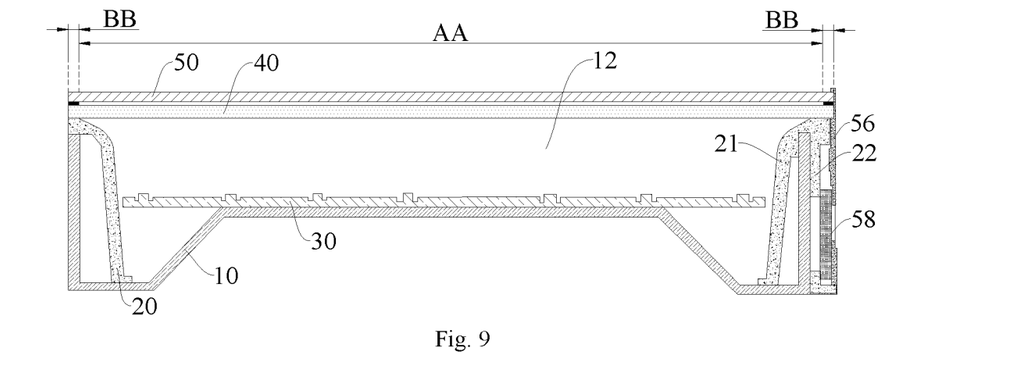
FIG. 9 is a structural diagram of a display module according to an embodiment of the disclosure.

According to the embodiment of the disclosure, referring to FIG. 9, the display module comprises a backplane 10; a supporting frame 20 connected with the backplane 10 to form a supporting structure together with the backplane 10, the supporting structure having an accommodating space 12; a luminous base plate 30 arranged on one side of the backplane 10 and located in the accommodating space 12; optical glass 40 arranged on a side, away from the luminous base plate 30, of the supporting structure; and a display screen 50 arranged on a side, away from the backplane 10, of the optical glass 40. According to the display module, as the optical glass encapsulated with the quantum dot fluorescent agents is adopted, an edge failure size is basically avoided; meanwhile, the thermal expansion coefficient of the optical glass is small, and an expansion space reserved during assembly with other components is small, which allows the display module to have a narrow frame, so that when the display module is applied to a spliced screen, a seam width may be greatly reduced; besides, the quantum dot fluorescent agent emits narrow half-peak width spectra, color purity is high, and the color gamut of the display module may be effectively improved, so as to improve the display effect; in addition, by adopting the optical glass, an additional diffuser plate is not needed, which is conductive to the thinning of the display module.

Figure 10:
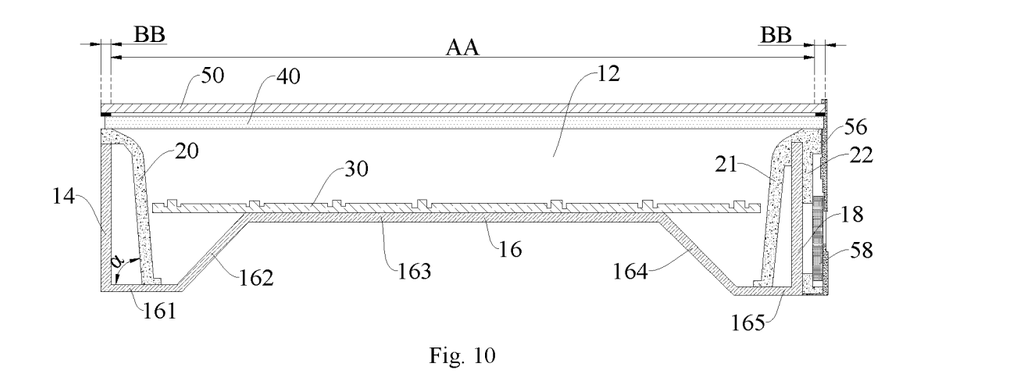
FIG. 10 is a structural diagram of a display module according to another embodiment of the disclosure.
Figure 11:
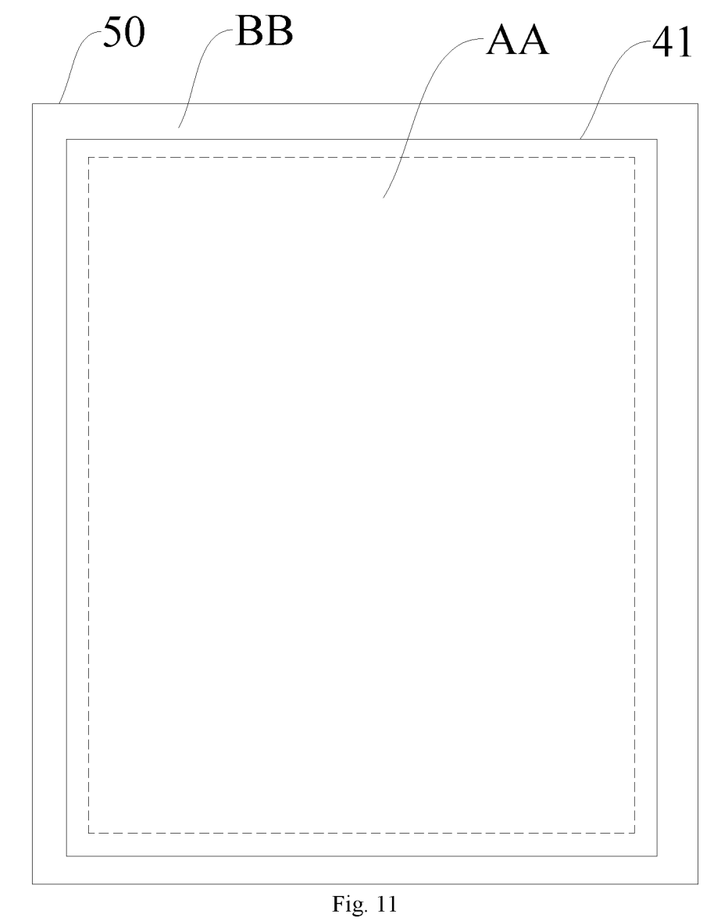
FIG. 11 is a diagram of an orthographic projection of optical glass on a display screen according to an embodiment of the disclosure.

According to the embodiment of the disclosure, referring to FIGS. 10 and 11, the display screen comprises an active area AA and a non-active area BB surrounding the active area, and an outline 41 of an orthographic projection of the optical glass 40 on the display screen 50 is located in the non-active area BB. It should be noted that the expression that the outline of the orthographic projection of the optical glass 40 on the display screen 50 is located in the non-active area covers the situation that the outline of the orthographic projection of the optical glass 40 on the display screen 50 overlaps with an outline of the display screen (refer to FIG. 9). Therefore, a luminous surface of the optical glass is larger than the area of the active area, so that the display effect may be ensured; meanwhile, an edge of the optical glass does not exceed an edge of the display screen, which may effectively reduce a frame width, so that when the display module is applied to a splicing screen, a seam width may be effectively reduced and the seam effect is improved. In some specific embodiments, referring to FIG. 11, the outline 41 of the orthographic projection of the optical glass 40 on the display screen 50 is located between the outline of the display screen 50 and an outline of the active area AA. Therefore, a certain machining allowance may be provided for a factory gluing positioning error and a backlight module assembly tolerance, so that the narrow frame effect of the display module is further ensured.

According to the embodiment of the disclosure, a specific material of the backplane may be selected according to actual needs. In some specific embodiments, the backplane may be a metal backplane, which has good mechanical properties, supporting performance, toughness and impact resistance, so as to better protect internal components of the display module.

According to the embodiment of the disclosure, referring to FIG. 10, the backplane comprises a first side wall 14, a bottom plate 16 and a second side wall 18 which are connected in sequence, the bottom plate 16 comprises a first horizontal section 161, a first inclined section 162, a second horizontal section 163, a second inclined section 164 and a third horizontal section 165 which are connected in sequence, the first horizontal section 161 is connected with the first side wall 14, and the third horizontal section 165 is connected with the second side wall 18; surfaces, close to the optical glass 40, of the first horizontal section 161, the second horizontal section 163 and the third horizontal section 165 are parallel to a light-exiting surface of the optical glass 40; a non-zero included angle exists between a surface, close to the optical glass 40, of the first inclined section 162 and the light-exiting surface of the optical glass 40, a non-zero included angle exists between a surface, close to the optical glass 40, of the second inclined section 164 and the light-exiting surface of the optical glass 40, and ends connected with the second horizontal section 163, of the first inclined section 162 and the second inclined section 164 are inclined towards the optical glass 40; and the luminous base plate 30 is arranged on the surface, close to the optical glass 40, of the second horizontal section 163. Therefore, the backplane has a multi-fold structure to maximally support the luminous base plate 30 on the premise that an appropriate light diffusion distance (or optical distance, OD) is ensured, ensure an overlapping area, and avoid the Mura phenomenon of light shadows caused by local deformation. The second horizontal section of the backplane bulges towards the optical glass, which reduces the thickness of the display module and shortens a distance between the luminous base plate and the optical glass, so as to improve the light utilization rate and further improve the display effect. In addition, the first horizontal section and the third horizontal section of the backplane may reserve a space to support the bottom of the support frame, so as to ensure that the support frame and a liquid crystal display screen are stressed flat, and avoid defects such as extrusion and light leakage.

According to the embodiment of the disclosure, a material of the supporting frame may also be selected according to actual needs. In some specific embodiments, the supporting frame may be an aluminum frame, which has good mechanical properties, supporting performance and machinability, the supporting frame may be easily machined to be in required shapes, and light emitted by the luminous base plate may be reflected, so that the light utilization rate is improved.

According to the embodiment of the disclosure, a connection mode of the backplane and the supporting frame may be flexibly selected according to actual needs. In some specific embodiments, referring to FIG. 12, the metal backplane 10 and the supporting frame 20 may be fixed by a fastener. specifically, the supporting frame 20 comprises a frame body 21; and at least one limiting part 22 arranged outside the frame body 21, an end, close to the optical glass 40, of the limiting part being connected with an end, close to the optical glass, of the frame body 21 to define a limiting groove 23, wherein a side wall of the backplane 10 is arranged in the limiting groove in a matching mode and fixed to the supporting frame through a fastener. In some specific examples, the fastener may be a screw. Specifically, refer to FIG. 12, the limiting part 22 is provided with a first opening 221, and a side wall of the backplane 10 is provided with a second opening 110 corresponding to the first opening. The screw 80 penetrates through the first opening 221 and the second opening 110 to lock and fix the backplane 10 and the supporting frame 20. Therefore, the overall strength and architecture stability of the display module are good.

It may be understood that the screw locking and fixing positions of the two opposite sides of the display module are not necessarily opposite, and correspondingly, the limiting parts on the supporting frame are not necessarily opposite, which needs to be flexibly adjusted according to the actual situation. Specifically, FIGS. 9 and 10 show a situation that the limiting parts and the screw locking and fixing positions are not opposite.

According to the embodiment of the disclosure, referring to FIG. 10, an included angle α between the frame body of the supporting frame and a horizontal section of the backplane may be 80°-90°, such as 80°, 81°, 82°, 83°, 84°, 85°, 86°, 87°, 88°, 89° and 90°. Within this angle range, brightness unevenness on the periphery may be reduced.

Figure 12:
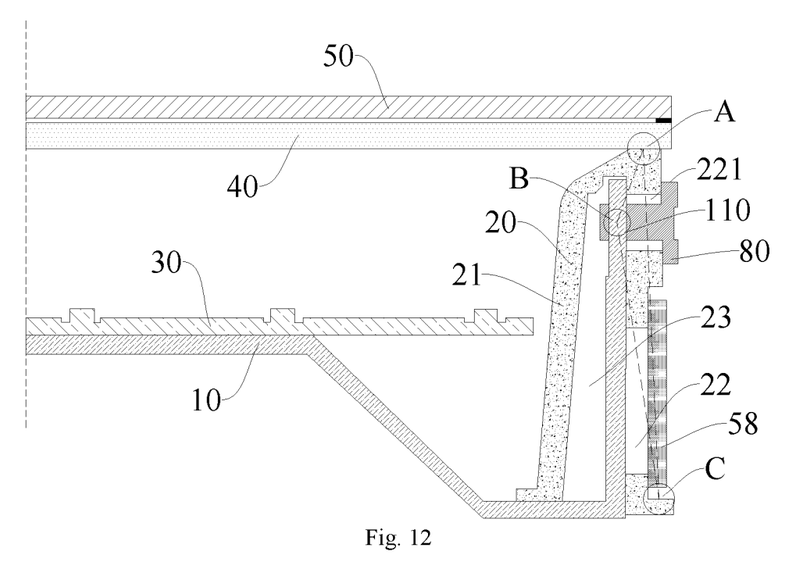
FIG. 12 is a partial structural diagram of a display module according to an embodiment of the disclosure.

According to the embodiment of the disclosure, referring to FIG. 12, a triangle is formed by the lines connecting a stressed support point A between the supporting frame 20 and the display screen 50, a screw locking point B, and a stressed support point C between the supporting frame and the backplane. Therefore, the mechanical triangle relationship may ensure the overall strength and architecture stability of the display module.

According to the embodiment of the disclosure, a plurality of light-emitting elements are arranged on the luminous base plate, and a specific type of the light-emitting element may be adjusted according to the use requirements of the display module. In some specific examples, the light-emitting element may be a micro light emitting diode (Micro-LED) or a mini light emitting diode (Mini-LED). Particularly, mini-LEDs or micro-LEDs are small and bright, and may be widely used in the backlight module of the display module and finely adjust backlight, thereby realizing the display of high-dynamic range (HDR) images. For example, the size (e.g., length) of the micro-LED may be less than 50 microns, such as 10 microns to 50 microns; and the size (e.g., length) of the mini-LED may be 50 microns to 150 microns, such as 80 microns to 120 microns. Therefore, higher screen brightness, more gorgeous picture effect, higher color saturation and better luminous uniformity may be implemented.

Figure 13:
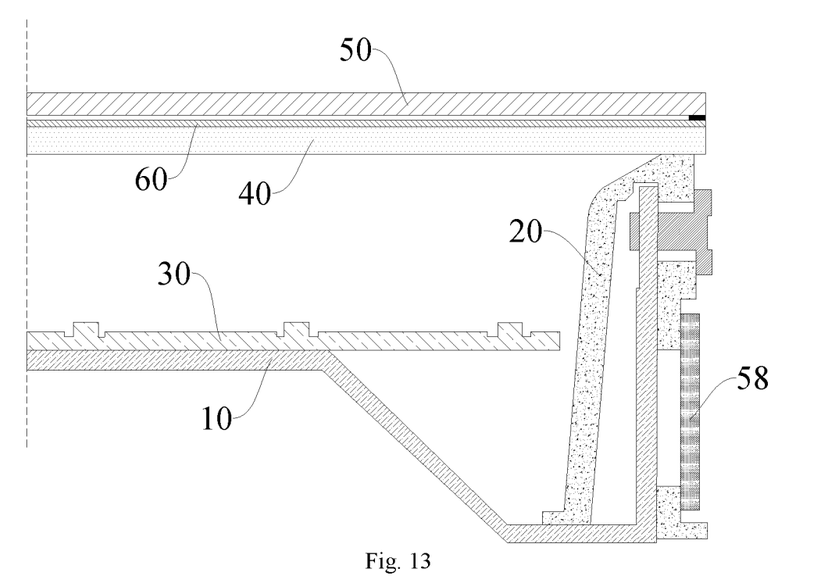
FIG. 13 is a partial structural diagram of a display module according to an embodiment of the disclosure.

According to the embodiment of the disclosure, referring to FIG. 13, a gain film 60 is arranged on the light-exiting surface of the optical glass 40. It may be understood that a specific type of the gain film may be flexibly selected according to the actual performance requirements of the display module, which may be a single type of gain films or a plurality of types of gain films stacked together. In some specific embodiments, the gain film 60 may comprise at least one of a prism film, a dual brightness enhancement film, a diffusion film, a dual brightness enhancement film and a prism composite film (COP composite film). Therefore, the brightness, light uniformity and other properties of the display module may be effectively improved, and a better display effect may be obtained.

According to the embodiment of the disclosure, the gain film is completely attached to the light-exiting surface of the optical glass by glue, and specifically, the gain film may be attached to the optical glass through a front surface of the optical glue. Therefore, assembly is simple, the overall cost of the display module may be reduced, and the product yield may be improved.

Figure 14:
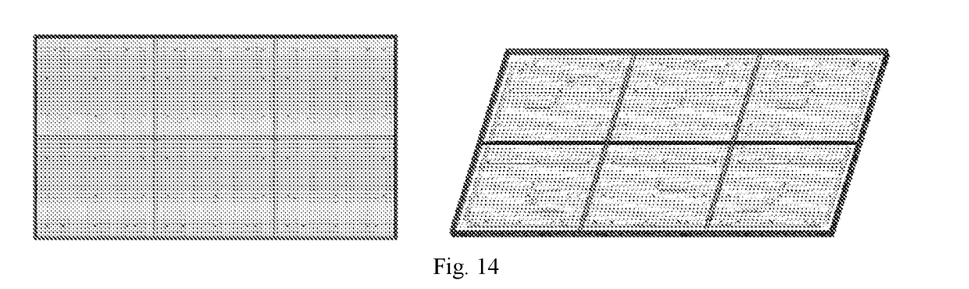
FIG. 14 is a structural diagram of a luminous base plate according to an embodiment of the disclosure.

In a specific example, assuming that the high brightness of 1000 nit is satisfied and a mini LED blue luminous base plate is adopted, 6 luminous base plates are used in total, which are distributed symmetrically to realize complete sharing, and 720 mini LED particles are arranged in each luminous base plate, so 4320 mini LED particles are used in total (see FIG. 14 for the structural diagram of the luminous base plate); and a prism film (with a thickness of 0.288 mm) and a COP composite film (with a thickness of 0.39 mm) are completely attached to the light-exiting surface of the optical glass (with a thickness of 1.8 mm), and the measured brightness gain may reach 1.89 times.

Figure 15:
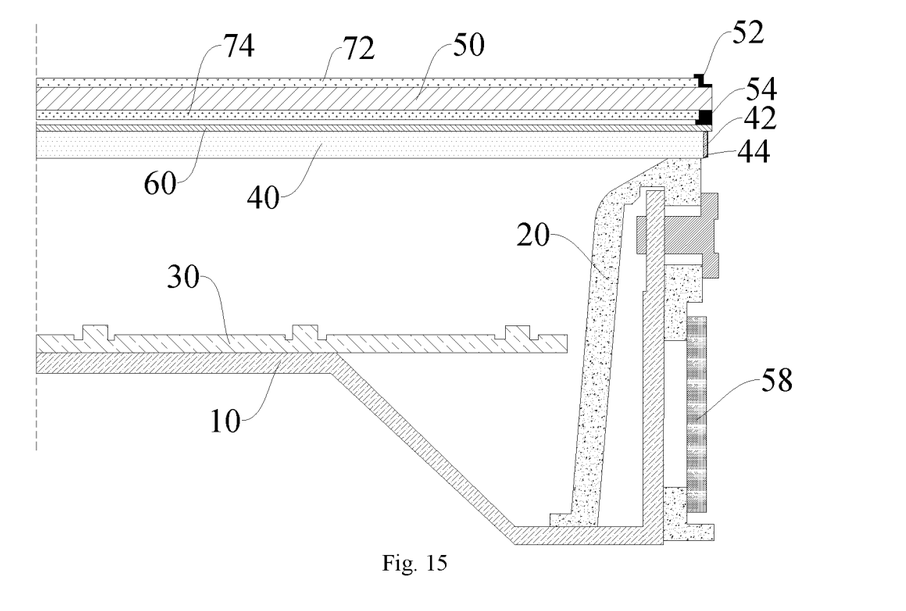
FIG. 15 is a partial structural diagram of a display module according to an embodiment of the disclosure.
Figure 16:
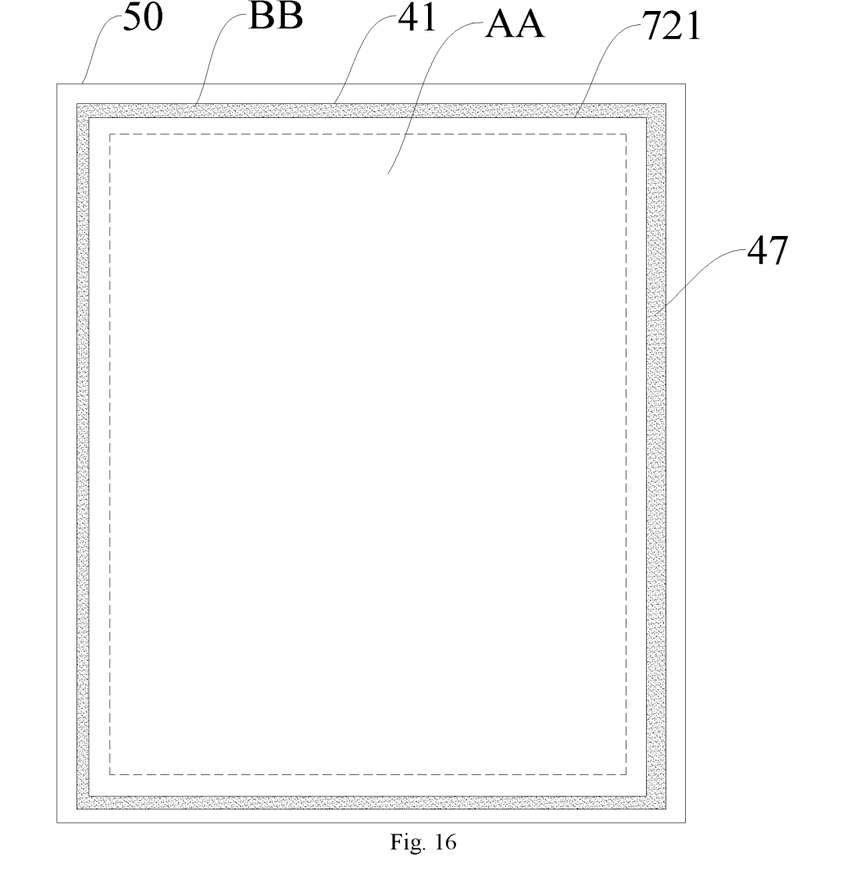
FIG. 16 is a diagram of orthographic projections of optical glass and an upper polarizer on a display screen according to an embodiment of the disclosure.

According to the embodiment of the disclosure, referring to FIGS. 15 and 16 (taking a first polarizer and a first light shielding layer as an example to explain the orthographic projection relationship on the display screen), the display module further comprises an upper polarizer 72 arranged on a surface, away from the backplane 10, of the display screen 50; a lower polarizer 74 arranged on a surface, close to the backplane 10, of the display screen 50; a first light shielding layer 52 arranged on a side, away from the display screen 50, of the upper polarizer 72, an orthographic projection of the first light shielding layer on the display screen 50 being located in the non-active area BB of the display screen; and a second light shielding layer 54 arranged on a side, away from the display screen 50, of the lower polarizer 74, an orthographic projection of the second light shielding layer on the display screen 50 being located in the non-active area BB of the display screen; wherein an orthographic projection of the optical glass 40 on the display screen 50 covers an orthographic projection of the upper polarizer 72 on the display screen and an orthographic projection of the lower polarizer 74 on the display screen, a first gap 47 exists between an outline 721 of the orthographic projection of the upper polarizer 72 on the display screen and an outline 41 of the orthographic projection of the optical glass 40 on the display screen, a second gap exists between an outline of the orthographic projection of the lower polarizer 74 on the display screen and the outline of the orthographic projection of the optical glass 40 on the display screen, the orthographic projection of the first light shielding layer 52 on the display screen covers the first gap, and the orthographic projection of the second light shielding layer 54 on the display screen covers the second gap. Therefore, the light leakage problem caused by an edge water vapor entry failure and the light leakage problem caused by high temperature shrinkage of the polarizers under high temperature and high moisture may be balanced. In some specific embodiments, the first light shielding layer and the second light shielding layer may be shading ink. Further, the shading ink may also be coated with a fluorinating agent. Therefore, the water vapor may be effectively isolated, so that the effect of shielding leaked light is better.

According to the embodiment of the disclosure, in order to further avoid edge light leakage, referring to FIG. 15, a third light shielding layer 42 is arranged on an end face of a side surface of the optical glass 40. Therefore, side edge light leakage may be effectively shielded and display quality may be improved. Specifically, the third light shielding layer 42 may be white UV glue, white ink or gray ink, which may be made by simple coating, so that both easy operation and a good light shielding effect are implemented and a bright line failure around a picture is avoided. Further, referring to FIG. 16, a covering layer 44 may also be arranged on a surface, away from the optical glass 40, of the third light shielding layer 42. Specifically, the covering layer may be aluminum foil tape. Therefore, electromagnetic interference of a device may be prevented, and light leakage of pixels may also be prevented. In some specific examples, referring to FIG. 15, an outline of an orthographic projection of the covering layer 44 on the display screen 50 is between the outline 721 of the orthographic projection of the upper polarizer 72 on the display screen 50 and the outline of the display screen. Therefore, a seam width is reduced in spliced display and a better display effect is achieved.

Figure 17:
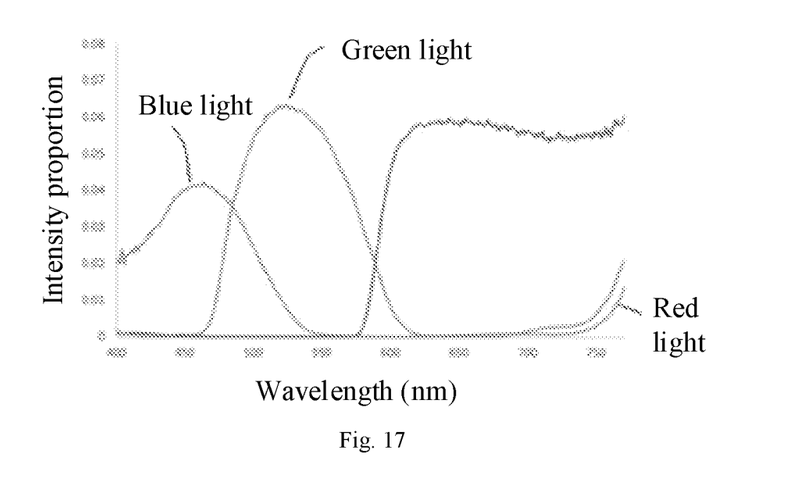
FIG. 17 is a diagram of color gamut wavelength distribution of a display module according to an embodiment of the disclosure.

According to the embodiment of the disclosure, the display module may implement an ultra-narrow frame spliced display effect. In some specific embodiments, a frame width (i.e., a distance between the outline of the active area and the outline of the display screen) of a side, connected with a COF (chip on film) 56, of the display module may be reduced to 0.6 mm, while a frame width of a side not connected with the COF may be reduced to 0.5 mm (see FIGS. 9 and 10 for structural diagrams). In addition, due to the low expansion and contraction of the optical glass, it is ensured that no dimensional change appears after long-term reliability verification, so as to ensure an optimal optical picture. The quantum dot fluorescent agent is encapsulated inside the optical glass, and the high light efficiency performance of the quantum dot fluorescent agent is ensured through photocuring, so that the color gamut is greatly improved. The color gamut may reach 100% NTSC or over (refer to FIG. 17 for the diagram of high color gamut wavelength distribution).

It may be understood that, in addition to the structures described above, the display module may also comprise necessary structures and components of conventional display modules, such as the COF 56 and a printed circuit board (PCB) 58 (refer to FIGS. 9 and 10), which may be determined with reference to the conventional technology, and will not be described in detail here.

In the description of the disclosure, it should be understood that the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the disclosure, "a plurality of" means two or more, unless otherwise specifically defined.

In the disclosure, unless otherwise specified and limited, the terms "install", "connect" and "fix" should be understood in a broad sense, for example, they may be fixed connection, detachable connection, integrated connection, mechanical connection, electrical connection, direct connection, indirect connection through an intermediate medium, internal communication between two elements or interaction between two elements. For those of ordinary skill in the art, the specific meanings of the above terms in the disclosure may be understood according to specific situations.

In the disclosure, unless otherwise specified and limited, a first feature is "above" or "below" a second feature may mean that the first feature and the second feature are in direct contact, or the first feature and the second feature are in indirect contact through an intermediary. Furthermore, the first feature is "above" the second feature may be that the first feature is directly above or obliquely above the second feature, or it only means that a level of the first feature is higher than that of the second feature; and the first feature is "below" the second feature may be that the first feature is directly below or obliquely below the second feature, or it only means that the level of the first feature is lower than that of the second feature.

In the description of this specification, descriptions referring to the terms "one embodiment", "some embodiments", "example", "specific example", or "some examples" mean that specific features, structures, materials or characteristics described in connection with the embodiment or example are included in at least one embodiment or example of the disclosure. In this specification, the schematic expressions of the above terms do not necessarily refer to the same embodiments or examples. Furthermore, the specific features, structures, materials or characteristics described may be combined in any one or more embodiments or examples in a suitable manner. In addition, those skilled in the art may combine different embodiments or examples and features of different embodiments or examples described in this specification without contradicting each other.

Although the embodiments of the disclosure have been shown and described above, it can be understood that the above-mentioned embodiments are exemplary and cannot be understood as limiting the disclosure, and those of ordinary skill in the art can make changes, modifications, substitutions and variations to the above-mentioned embodiments within the scope of the disclosure.

The invention claimed is:

1. Optical glass, comprising:
   a glass substrate; and
   optical masterbatches dispersed in the glass substrate, each optical masterbatch comprising a quantum dot fluorescent agent inner core and an encapsulation shell which encloses the quantum dot fluorescent agent inner core.

2. The optical glass according to claim 1, further comprising:
   a diffusion particle layer arranged on at least one surface of the glass substrate.

3. The optical glass according to claim 1, wherein the optical glass is satisfied with at least one of the following conditions:
   the glass substrate comprises nano-calcium ultra-white glass;
   the quantum dot fluorescent agent comprises at least one of a green quantum dot fluorescent agent and a red quantum dot fluorescent agent, a luminous peak range of the green quantum dot fluorescent agent is 510-550 nm, and a luminous peak range of the red quantum dot fluorescent agent is 610-670 nm; and
   the encapsulation shell is formed by photocuring at least one of a diffusing agent, an anti-UV agent, an oxidizing agent, a light stabilizer and a lubricating dispersant.

4. A manufacturing method of optical glass, comprising:
   mixing an encapsulation mixture with quantum dot fluorescent agents to obtain a first mixture, and sequentially performing granulating and photocuring to the first mixture, to obtain optical masterbatches; and
   mixing the optical masterbatches with glass substrate powder to obtain a second mixture, and casting the second mixture, to obtain the optical glass.

5. The method according to claim 4, wherein the method is satisfied with at least one of the following conditions:
   a mass ratio of the encapsulation mixture to the quantum dot fluorescent agent is (1-25):(1-9); and
   a mass ratio of the optical masterbatches to the glass substrate powder is (3-10): 100.

6. The method according to claim 4, wherein the method is satisfied with at least one of the following conditions:
   the granulation is performed by adopting a double-screw granulator, and a granulating pressure is 3-15 MPa;
   a light source for photocuring is an ultraviolet light source, curing energy is 100-2000 $J/m^2$, and a curing time is 3-60 min; and
   mixing the optical masterbatches with the glass substrate powder comprises: pretreating the optical masterbatches at 150° C.-500° C. for 1-5 h, then dissolving the pretreated optical masterbatches and the glass substrate powder at 800° C.-1500° C., and keeping the dissolving temperature for 3-10 h.

7. The method according to claim 4, further comprising:
   coating at least one surface of a product obtained by casting with a diffusion particle layer.

8. A backlight module, comprising the optical glass according to claim 1.

9. A display module, comprising the backlight module according to claim 8.

10. The display module according to claim 9, comprising:
- a backplane;
- a supporting frame connected with the backplane to form a supporting structure together with the backplane, the supporting structure is provided with an accommodating space;
- a luminous base plate arranged on one side of the backplane and located in the accommodating space;
- optical glass arranged on a side, away from the luminous base plate, of the supporting structure; and
- a display screen arranged on a side, away from the backplane, of the optical glass.

11. The display module according to claim 10, wherein the display screen comprises an active area and a non-active area surrounding the active area, and an outline of an orthographic projection of the optical glass on the display screen is located in the non-active area.

12. The display module according to claim 10, wherein the backplane comprises a first side wall, a bottom plate and a second side wall which are connected in sequence, the bottom plate comprises a first horizontal section, a first inclined section, a second horizontal section, a second inclined section and a third horizontal section which are connected in sequence, the first horizontal section is connected with the first side wall, and the third horizontal section is connected with the second side wall; surfaces, close to the optical glass, of the first horizontal section, the second horizontal section and the third horizontal section are parallel to a light-exiting surface of the optical glass; a non-zero included angle exists between a surface, close to the optical glass, of the first inclined section and the light-exiting surface of the optical glass, a non-zero included angle exists between a surface, close to the optical glass, of the second inclined section and the light-exiting surface of the optical glass, and ends connected with the second horizontal section, of the first inclined section and the second inclined section are inclined towards the optical glass; and
- the luminous base plate is arranged on the surface, close to the optical glass, of the second horizontal section.

13. The display module according to claim 12, wherein the supporting frame comprises:
- a frame body; and
- at least one limiting part arranged outside the frame body, an end of the limiting part, close to the optical glass, being connected with an end of the frame body, close to the optical glass to define a limiting groove;
- wherein, a side wall of the backplane is arranged in the limiting groove in a matching mode and fixed to the supporting frame through a fastener.

14. The display module according to claim 13, wherein an included angle between the frame body of the supporting frame and a horizontal section of the backplane is 80-90 degrees.

15. The display module according to claim 13, wherein a triangle is formed by the lines connecting a stressed support point between the frame body of the supporting frame and the optical glass, a fixation point of the fastener, and a stressed support point between the limiting part of the supporting frame and the backplane.

16. The display module according to claim 9, wherein a gain film is arranged on the light-exiting surface of the optical glass, the gain film comprises at least one of a prism film, a dual brightness enhancement film, a diffusion film, a dual brightness enhancement film and a prism composite film.

17. The display module according to claim 9, further comprising:
- an upper polarizer arranged on a surface, away from the backplane, of the display screen;
- a lower polarizer arranged on a surface, close to the backplane, of the display screen;
- a first light shielding layer arranged on a side, away from the display screen, of the upper polarizer, an orthographic projection of the first light shielding layer on the display screen being located in the non-active area of the display screen; and
- a second light shielding layer arranged on a side, away from the display screen, of the lower polarizer, an orthographic projection of the second light shielding layer on the display screen being located in the non-active area of the display screen;
- wherein, an orthographic projection of the optical glass on the display screen covers an orthographic projection of the upper polarizer on the display screen and an orthographic projection of the lower polarizer on the display screen, a first gap exists between an outline of the orthographic projection of the upper polarizer on the display screen and an outline of the orthographic projection of the optical glass on the display screen, a second gap exists between an outline of the orthographic projection of the lower polarizer on the display screen and the outline of the orthographic projection of the optical glass on the display screen, the orthographic projection of the first light shielding layer on the display screen covers the first gap, and the orthographic projection of the second light shielding layer on the display screen covers the second gap.

18. The display module according to claim 10, wherein a third light shielding layer is arranged on an end surface of a side surface of the optical glass, and a covering layer is arranged on a surface, away from the optical glass, of the third light shielding layer.

19. A backlight module, comprising the optical glass obtained by the manufacturing method according to claim 4.

20. A display module, comprising the backlight module according to claim 19.

* * * * *